United States Patent
Narita et al.

(10) Patent No.: US 9,162,316 B2
(45) Date of Patent: Oct. 20, 2015

(54) ELECTRON BEAM WELDING METHOD

(75) Inventors: Ryuichi Narita, Tokyo (JP); Takashi Hanioka, Tokyo (JP); Tadahiro Kimura, Tokyo (JP); Masahiro Kimura, Tokyo (JP); Masao Shiota, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 331 days.

(21) Appl. No.: 13/812,074

(22) PCT Filed: Jul. 20, 2011

(86) PCT No.: PCT/JP2011/066440
§ 371 (c)(1),
(2), (4) Date: Jan. 24, 2013

(87) PCT Pub. No.: WO2012/020626
PCT Pub. Date: Feb. 16, 2012

(65) Prior Publication Data
US 2013/0126484 A1 May 23, 2013

(30) Foreign Application Priority Data
Aug. 11, 2010 (JP) .................................. 2010-180200

(51) Int. Cl.
*B23K 15/00* (2006.01)

(52) U.S. Cl.
CPC ........... *B23K 15/0046* (2013.01); *B23K 15/006* (2013.01); *B23K 15/0053* (2013.01); *B23K 15/00* (2013.01)

(58) Field of Classification Search
CPC ................................. B23K 15/00; B23K 31/00

USPC ............ 219/121.13, 121.14, 121.35, 121.64; 228/225, 184
See application file for complete search history.

(56) References Cited

U.S. PATENT DOCUMENTS
4,691,093 A * 9/1987 Banas et al. ............. 219/121.63

FOREIGN PATENT DOCUMENTS

| JP | 48-041819 B1 | 12/1973 |
| JP | 48-041820 B1 | 12/1973 |
| JP | 51-107245 A | 9/1976 |
| JP | 62-130776 A | 6/1987 |
| JP | 02-151374 A | 6/1990 |

(Continued)

OTHER PUBLICATIONS

Japanese Decision to Grant a Patent dated Apr. 1, 2014, issued in corresponding Japanese Patent Application No. 2010-180200 (3 pages).

(Continued)

*Primary Examiner* — Samuel M Heinrich
(74) *Attorney, Agent, or Firm* — Westerman, Hattori, Daniels & Adrian, LLP

(57) ABSTRACT

An electron beam welding method capable of restoring toughness even when high heat input welding is performed. The electron beam welding method comprises: forming a first weld bead (3) so as to include a groove (2) provided at the butt portions of two base materials (1), and forming a second weld bead (4) and a third weld bead (5) having a narrower width than the first weld bead (3), at predetermined positions displaced from the groove (2) and centered symmetrically about the butt portions so as to include a portion of the first weld bead (3), using a lower heat input than that used during formation of the first weld bead (3).

4 Claims, 2 Drawing Sheets

(56) References Cited

FOREIGN PATENT DOCUMENTS

| | | |
|---|---|---|
| JP | 02-165877 A | 6/1990 |
| JP | 10-314960 A | 12/1998 |

OTHER PUBLICATIONS

International Search Report of PCT/JP2011/066440, mailing date of Nov. 1, 2011.

* cited by examiner

ELECTRON BEAM WELDING METHOD

TECHNICAL FIELD

The present invention relates to an electron beam welding method, and relates particularly to an electron beam welding method applied to the joints within thick plate structures.

BACKGROUND ART

One method of welding low-alloy steel or a similar steel material is a method that uses a high-density electron beam (see PTL 1). It is known that the crystal grains become coarser and the toughness deteriorates in weld zone. Accordingly, the weld is subjected to a post weld heat treatment or the like to restore the toughness.

Further, in steam generators of pressurized water reactors and the like, the desire to increase output of power generation plants has lead to demands for larger generators, and this has been accompanied by a trend toward the use of thicker plates in structures.

CITATION LIST

Patent Literature

{PTL 1} Japanese Unexamined Patent Application, Publication No. Hei 10-314960 (claim 1)

SUMMARY OF INVENTION

Technical Problem

In recent years, in order to reduce manufacturing costs, steel manufacturers have been shifting the method used for manufacturing steel plate from the ingot-making to continuous casting. When a steel plate manufactured by continuous casting is welded by an electron beam, the toughness of the weld tends to deteriorate. Accordingly, a problem arises in that with normal welding and heat treatment, the tolerance associated with achieving the desired joint performance tends to decrease.

In welding of a low-alloy steel or similar steel material using an electron beam, the amount of heat input into the base material must be increased as the thickness of the structure is increased. However, the toughness of the weld tends to decrease as the amount of heat input into the base material is increased. As a result, a problem exists in that for a joint in a thick-plate structure, satisfactory restoration of the toughness of the weld cannot be expected simply by performing a post weld heat treatment. For example, when a base material having a plate thickness of 100 mm is processed with a single pass, the joint performance satisfies the required values. On the other hand, when a base material having a plate thickness of 120 mm is processed with a single pass, the tolerance associated with achieving the required values for the weld toughness tends to decrease, and therefore in order to satisfy quality requirements, a further technique must be used to improve the toughness.

In order to address the above problems, methods have been proposed that improve the toughness of the weld by altering the chemical composition of the weld via a technique such as the addition of a filler material having an appropriate chemical component to the welded metal of the weld. However, when butt welding of thick plates is conducted by electron beam welding, welding using an added filler cannot be performed.

Furthermore, in electron beam welding, because the weld bead is prone to deflections caused by fine magnetism, weld defects caused by misalignment tend to occur readily. This misalignment becomes more likely as the plate thickness increases. The weld bead can be widened to prevent misalignment, but increasing the width of the weld bead requires a high heat input, resulting in a deterioration in the performance such as the toughness of the weld.

The present invention has been developed in light of the above circumstances, and has an object of providing an electron beam welding method capable of restoring toughness, even to a weld formed with a high heat input in order to prevent misalignment.

Solution to Problem

In order to achieve the above object, the present invention provides an electron beam welding method comprising: forming a first weld bead so as to include a groove provided at the butt portions of two base materials, and forming a second weld bead and a third weld bead having a narrower width than the first weld bead, at predetermined positions displaced from the groove and centered symmetrically about the butt portions so as to include a portion of the first weld bead, using a lower heat input than that used during formation of the first weld bead.

According to the present invention, the first weld bead is formed with as broad a width as possible. This enables a reduction in the likelihood of misalignment occurring during formation of the first weld bead. Further, the second weld bead and third weld bead are formed on either side of the first weld bead so as to not include the groove, and therefore the width of the overall weld bead becomes wider. As a result, even if misalignment occurs within the first weld bead, misalignment can be prevented by the second weld bead and the third weld bead, meaning the occurrence of weld defects can be prevented.

Furthermore, by forming the second weld bead and third weld bead in positions displaced from the groove, a heating effect can be applied to the first weld bead from the outer periphery of the first weld bead. The second weld bead and third weld bead are formed using a lower heat input than that used for the first weld bead, and therefore a heating effect can be applied at least twice at a position close to the center of the first weld bead. As a result, the crystal grains of the first weld bead can be refined. Furthermore, both side portions of the first weld bead are remelted by the low heat input, causing a grain refining. Accordingly, the toughness of both side portions and the central portion of the weld can be improved.

In one aspect of the present invention described above, the width of the first weld bead is preferably not less than 5 mm. This enables a reduction in the likelihood of misalignment.

Advantageous Effects of Invention

The present invention is able to provide an electron beam welding method that inhibits misalignment, and is capable of restoring toughness even to welds formed with a high heat input.

DESCRIPTION OF EMBODIMENTS

An embodiment of the electron beam welding method according to the present invention is described below with reference to the drawings.

Figure 1:
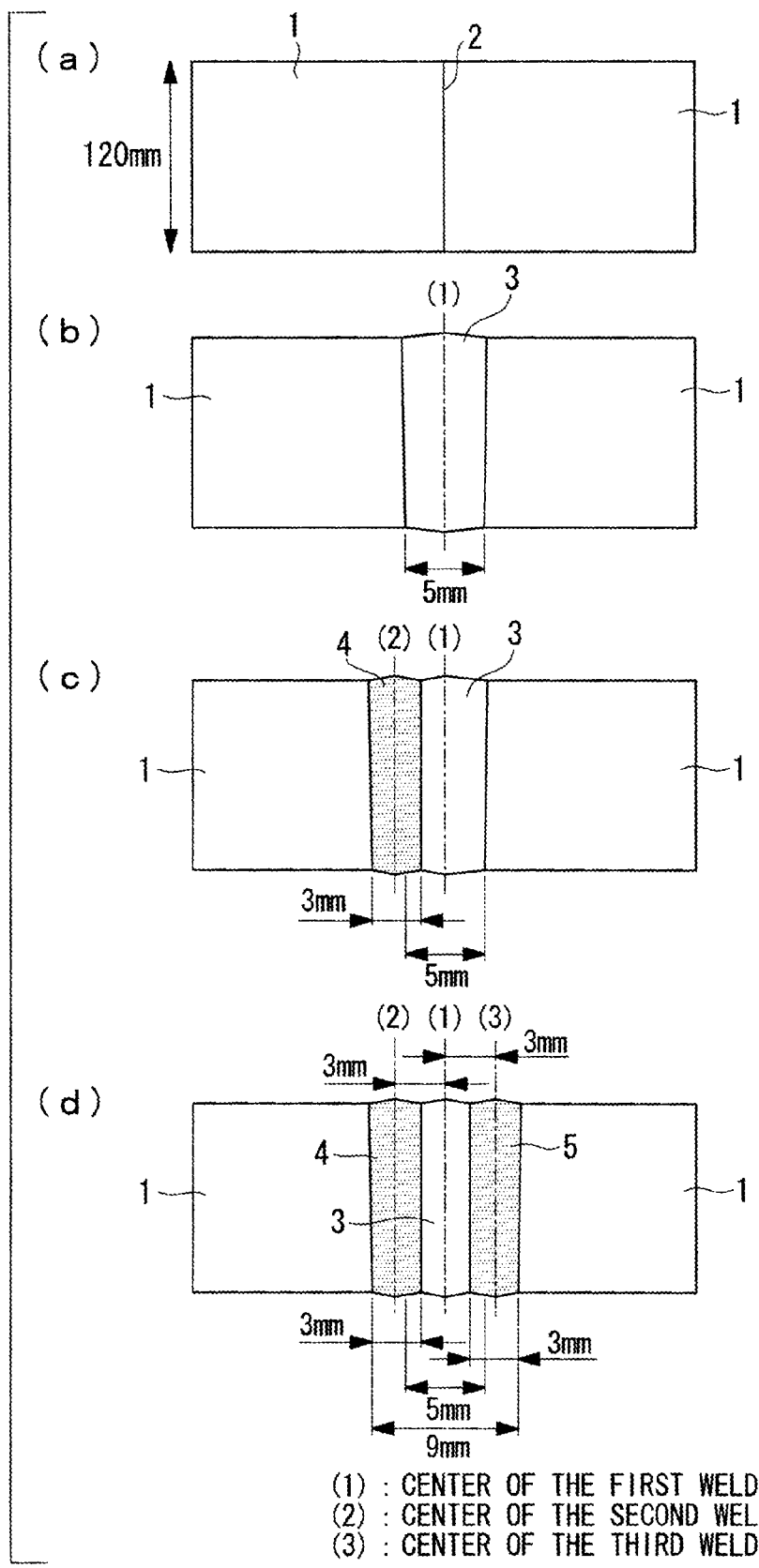
FIG. 1 A diagram describing one example of the steps of an electron beam welding method according to an embodiment of the present invention.

FIG. 1 is a diagram describing one example of the steps of the electron beam welding method according to this embodiment. It should be noted that FIG. 1 is not drawn to actual scale.

The electron beam welding method according to the present embodiment comprises a step of forming a first weld bead, and a step of forming a second weld bead and a third weld bead.

(1) FIG. 1(a)

A low-alloy steel or similar steel material is used for the welding target members (base materials) 1. A specific example of the base material 1 is SQV2B or the like. The thickness of the base material 1 is within a range from approximately 100 mm to 120 mm. Two of the base materials 1 are butted together, and a groove 2 is provided at the butt portions.

(2) FIG. 1(b)

In the step of forming a first weld bead 3, the first weld bead 3 is formed so as to include the groove 2, and is preferably formed with the center of the first weld bead 3 coinciding with the groove 2. The width of the first weld bead 3 is quite broad, and is preferably set to a value of not less than 5 mm. In this embodiment, the term "width" refers to the distance across the narrowest portion of the weld bead. In order to form the weld bead with the above width, the electron beam welding is conducted with a high heat input. This high heat input welding is performed with a heat input of not less than 25 kJ/cm$^2$. Specific conditions for performing the electron beam welding include an accelerating voltage of 150 kV, a beam current of 250 mA, and a welding speed of 75 mm/min., but the values for each of the parameters may be set appropriately in accordance with the material and the thickness and the like of the base material 1. The welding is performed using a vertical welding position.

(3) FIG. 1(c) and FIG. 1(d)

In the step of forming a second weld bead 4 and a third weld bead 5, the second weld bead 4 and the third weld bead 5 are formed at predetermined positions centered symmetrically about the butt portions of the base materials 1, and preferably centered symmetrically about the center of the first weld bead 3. The second weld bead 4 and the third weld bead 5 do not include the groove 2, but each includes a portion of the first weld bead 3. The width of the second weld bead 4 and the third weld bead 5 is set to a narrower value than the width of the first weld bead 3. For example, the width of the second weld bead 4 and the third weld bead 5 is preferably approximately 3 mm. In order to form the second weld bead 4 and the third weld bead 5 with the above width, the electron beam welding is conducted with a lower heat input than that used during formation of the first weld bead. Specific conditions for performing the electron beam welding include an accelerating voltage of 150 kV, a beam current of 200 mA, and a welding speed of 90 mm/min., but the values for each of the parameters may be set appropriately in accordance with the material and the thickness of the base material 1, and the welding conditions used for forming the first weld bead 3. The welding is performed using a vertical welding position.

A description is provided below for the case in which the butt portions of the base materials 1 coincide with the bead center of the first weld bead 3. In the present embodiment, the second weld bead 4 is formed following formation of the first weld bead 3. The second weld bead 4 is formed to one side of the first weld bead 3, in a position displaced from the groove 2, but so as to overlap a portion of the first weld bead 3. Next, the third weld bead 5 is formed in the same manner as the second weld bead 4, in a position symmetrically opposed to the second weld bead 4 with the first weld bead 3 disposed therebetween.

In the present embodiment, the step of forming the second weld bead 4 and the third weld bead 5 may be performed a plurality of times.

Next the effects of the electron beam welding method according to the present embodiment are described using examples.

EXAMPLE 1

SQV2B having a plate thickness of 120 mm was used for the base materials.

A first weld bead having a width of 5 mm was formed at the groove between the base materials. The welding conditions included an accelerating voltage of 150 kV, a beam current of 250 mA, and a welding speed of 75 mm/min.

Subsequently, a second weld bead having a width of 3 mm was formed with the center of the bead along a position offset 3 mm from the center of the first weld bead. The welding conditions included an accelerating voltage of 150 kV, a beam current of 200 mA, and a welding speed of 90 mm/min.

Next, a third weld bead having a width of 3 mm was formed on the opposite side of the first weld bead to the second weld bead, with the center of the bead along a position offset 3 mm from the center of the first weld bead. The welding conditions were the same as those described for the second weld bead.

Reference Example 1

The same material as Example 1 was used for the base materials.

A first weld bead having a width of approximately 5 mm was formed at the groove between the base materials. The welding conditions included an accelerating voltage of 150 kV, a beam current of 250 mA, and a welding speed of 75 mm/min. The welding was performed using a vertical welding position.

Subsequently, a second weld bead having a width of 3 mm was formed along the center of the first weld bead. The welding conditions included an accelerating voltage of 150 kV, a beam current of 200 mA, and a welding speed of 90 mm/min. The welding was performed using a vertical welding position.

Test pieces were prepared in accordance with JIS Z 3128 from the base material joints welded in Example 1 and Reference Example 1. The test pieces were sampled from positions at a depth equivalent to ¼ of the thickness of the base material from the surface of the base material, which is considered to be the position having the smallest impact value.

The test pieces were subjected to a Charpy impact test in accordance with JIS Z 2242.

Figure 2:
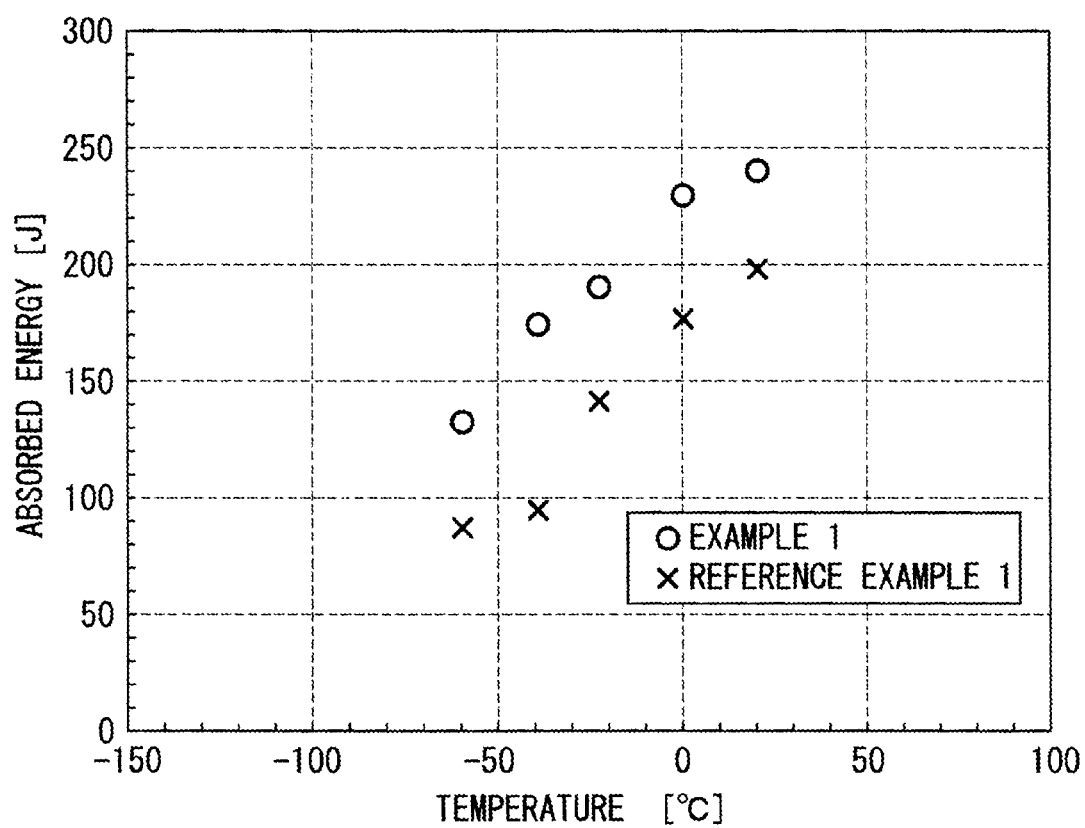
FIG. 2 A diagram illustrating the change in absorbed energy for different welding methods.

FIG. 2 illustrates the change in absorbed energy for the different welding methods. The absorbed energy for Example 1 was higher than that observed for Reference Example 1. As the crystal grain of the weld bead is refined, the absorbed energy increases, and the toughness is improved. The above results confirmed that the toughness of Example 1 had been improved compared with Reference Example 1.

In Reference Example 1, the first weld bead is formed with high heat input, and the second weld bead is formed with low heat input along the center of the first weld bead, namely in a position that includes the groove. When the welding of the following pass is performed with low heat input at a position that includes the groove, the center of the first weld bead is remelted. By remelting the weld with low heat input, the crystal grains are refined. The low heat input refers to a heat input of approximately 15 kJ/cm$^2$.

On the other hand, in Example 1, although the first weld bead is formed with high heat input, the second weld bead and third weld bead are formed with low heat input on either side of the first weld bead. As a result, both side portions of the first weld bead are remelted during formation of the second weld bead and third weld bead, and the crystal grains are refined. Further, the central portion of the first weld bead does not remelt, but the crystal grains are refined due to the heating effects received during formation of the second weld bead and third weld bead.

Based on the above results, it was found that the central portion of the first weld bead including the groove (the main weld) exhibited a greater improvement in toughness when exposed to heating effects rather than when remelted. Further, in Example 1, the main weld is exposed to heating effects a plurality of times from both sides of the first weld bead, and therefore the effect of the invention in grain refining is enhanced.

Furthermore, in Reference Example 1, because the second weld bead is formed within the bounds of the first weld bead, the overall weld bead width is limited by the width of the first weld bead. In contrast, in Example 1, because the second weld bead and third weld bead are formed on either side of the first weld bead, the width of the overall weld bead can be increased. In Example 1, the width of the weld bead is approximately twice the width of the weld bead in Reference Example 1, and therefore misalignment becomes unlikely. In Example 1, it can be said that all of the formed beads contribute to preventing misalignment.

REFERENCE SIGNS LIST

1 Base material
2 Groove
3 First weld bead
4 Second weld bead
5 Third weld bead

The invention claimed is:

1. An electron beam welding method comprising:
   forming a first weld bead so as to include a groove provided at butt portions of two base materials, and
   forming a second weld bead and a third weld bead having a narrower width than the first weld bead, at predetermined positions displaced from the groove and centered symmetrically about the butt portions so as to include side portions of the first weld bead throughout a thickness direction of the base materials, using a lower heat input than that used during formation of the first weld bead.

2. The electron beam welding method according to claim 1, wherein a width of the first weld bead is not less than 5 mm.

3. A method of producing a welded structure using the electron beam welding method according to claim 1.

4. A method of producing a welded structure using the electron beam welding method according to claim 2.

* * * * *